US012301435B2

(12) United States Patent
Vasseur et al.

(10) Patent No.: US 12,301,435 B2
(45) Date of Patent: May 13, 2025

(54) OPTIMIZING APPLICATION EXPERIENCE IN HYBRID WORK ENVIRONMENTS

(71) Applicant: Cisco Technology, Inc., San Jose, CA (US)

(72) Inventors: Jean-Philippe Vasseur, Saint Martin d'Uriage (FR); Vinay Kumar Kolar, San Jose, CA (US); Grégory Mermoud, Venthône (CH); Eduard Schornig, Haarlem (NL); Michal Wladyslaw Garcarz, Cracow (PL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/873,324

(22) Filed: Jul. 26, 2022

(65) Prior Publication Data
US 2024/0039811 A1 Feb. 1, 2024

(51) Int. Cl.
*H04L 43/08* (2022.01)
*H04L 41/0896* (2022.01)
*H04L 41/5019* (2022.01)
*H04L 41/5025* (2022.01)
*H04L 41/5067* (2022.01)
(Continued)

(52) U.S. Cl.
CPC .......... *H04L 43/08* (2013.01); *H04L 41/0896* (2013.01); *H04L 41/5019* (2013.01); *H04L 41/5025* (2013.01); *H04L 41/5067* (2013.01); *H04L 43/028* (2013.01); *H04L 67/10* (2013.01); *H04L 43/0876* (2013.01)

(58) Field of Classification Search
CPC ............. H04L 41/0896; H04L 41/5019; H04L 41/5025; H04L 41/5067; H04L 43/028; H04L 43/08; H04L 43/0876; H04L 67/10
See application file for complete search history.

(56) References Cited

U.S. PATENT DOCUMENTS 8,280,994 B2 * 10/2012 Blouin ................ H04L 43/0817
709/224
9,641,411 B1 * 5/2017 Rogan ................. H04L 43/0817
(Continued)

OTHER PUBLICATIONS

Bhattacharyya et al. "QFlow: A Learning Approach to High QoE Video Streaming at the Wireless Edge", arxiv.org website, May 13, 2020 [retrieved on Dec. 17, 2022]. Retrieved from the Internet: <URL: https://arxiv.org/pdf/1901.00959.pdf>. (Year: 2020).*

*Primary Examiner* — Thomas J Dailey
(74) *Attorney, Agent, or Firm* — BEHMKE INNOVATION GROUP LLC; James M. Behmke; James J. Wong

(57) ABSTRACT

In one embodiment, a device identifies a plurality of online applications whose traffic is conveyed via an interface of a networking entity of a network. The device computes a relationship between a quality of experience metric for a particular online application in the plurality of online applications and a traffic volume associated with the interface for the plurality of online applications. The device makes, based on the relationship, a determination that degradation of the quality of experience metric for the particular online application is due to the traffic volume associated with the interface for the plurality of online applications. The device reconfigures, based on the determination, the networking entity to prioritize traffic for the particular online application.

16 Claims, 10 Drawing Sheets

(51) Int. Cl.
*H04L 43/028* (2022.01)
*H04L 43/0876* (2022.01)
*H04L 67/10* (2022.01)

(56) References Cited

U.S. PATENT DOCUMENTS

| | | | |
|---|---|---|---|
| 9,819,565 B2 | 11/2017 | Djukic et al. | |
| 10,574,545 B2 | 2/2020 | Feller et al. | |
| 10,955,886 B2* | 3/2021 | Ragupathi | G06F 9/4893 |
| 11,025,663 B1 | 6/2021 | Russell et al. | |
| 2008/0089237 A1* | 4/2008 | Molen | H04L 47/2433 |
| | | | 370/252 |
| 2011/0103392 A1* | 5/2011 | Fan | H04L 45/38 |
| | | | 370/401 |
| 2016/0014229 A1* | 1/2016 | Seedorf | H04L 47/2475 |
| | | | 370/235 |
| 2016/0142935 A1* | 5/2016 | Oettl | H04W 28/0252 |
| | | | 370/235 |
| 2017/0373950 A1* | 12/2017 | Szilagyi | H04L 43/091 |
| 2018/0026896 A1* | 1/2018 | Szilagyi | H04W 28/0268 |
| | | | 370/235 |
| 2020/0186433 A1 | 6/2020 | Cui et al. | |
| 2020/0314503 A1* | 10/2020 | Wang | H04L 65/762 |
| 2021/0152455 A1* | 5/2021 | Castle | H04L 43/0876 |
| 2021/0328884 A1 | 10/2021 | Veres et al. | |
| 2022/0029884 A1 | 1/2022 | Johnson et al. | |
| 2022/0239720 A1* | 7/2022 | Madanapalli | H04L 65/612 |
| 2022/0376998 A1* | 11/2022 | Vasseur | H04L 69/326 |
| 2023/0065207 A1* | 3/2023 | Wang | H04L 43/0858 |

* cited by examiner

OPTIMIZING APPLICATION EXPERIENCE IN HYBRID WORK ENVIRONMENTS

TECHNICAL FIELD

The present disclosure relates generally to computer networks, and, more particularly, to optimizing application experience in hybrid work environments.

BACKGROUND

The user experience with online applications, such as those used for video conferencing, streaming content, etc., is highly dependent on the performance of the network over which its traffic is conveyed. Today, the quality of experience (QoE) of an online application is often measured using static formulas and service level agreement (SLA) threshold definitions. The most prevalent method in use today relies on calculating the QoE as a mean opinion score (MOS) value, which is often a function of the path characteristics (e.g., loss, latency, and jitter).

From a networking perspective, optimizing the QoE of an online application is particularly challenging in hybrid work environments. Indeed, in contrast to traditional enterprise networks, home networks utilized by remote workers may generate and receive a wide variety of traffic for different types of online applications. For instance, consider the case in which a remote worker is using a videoconferencing application from their home office at the same time that a family member is watching a streaming service in another room. In such a case, the coexistence of both types of application traffic on the network could result in degraded QoE for either or both applications.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
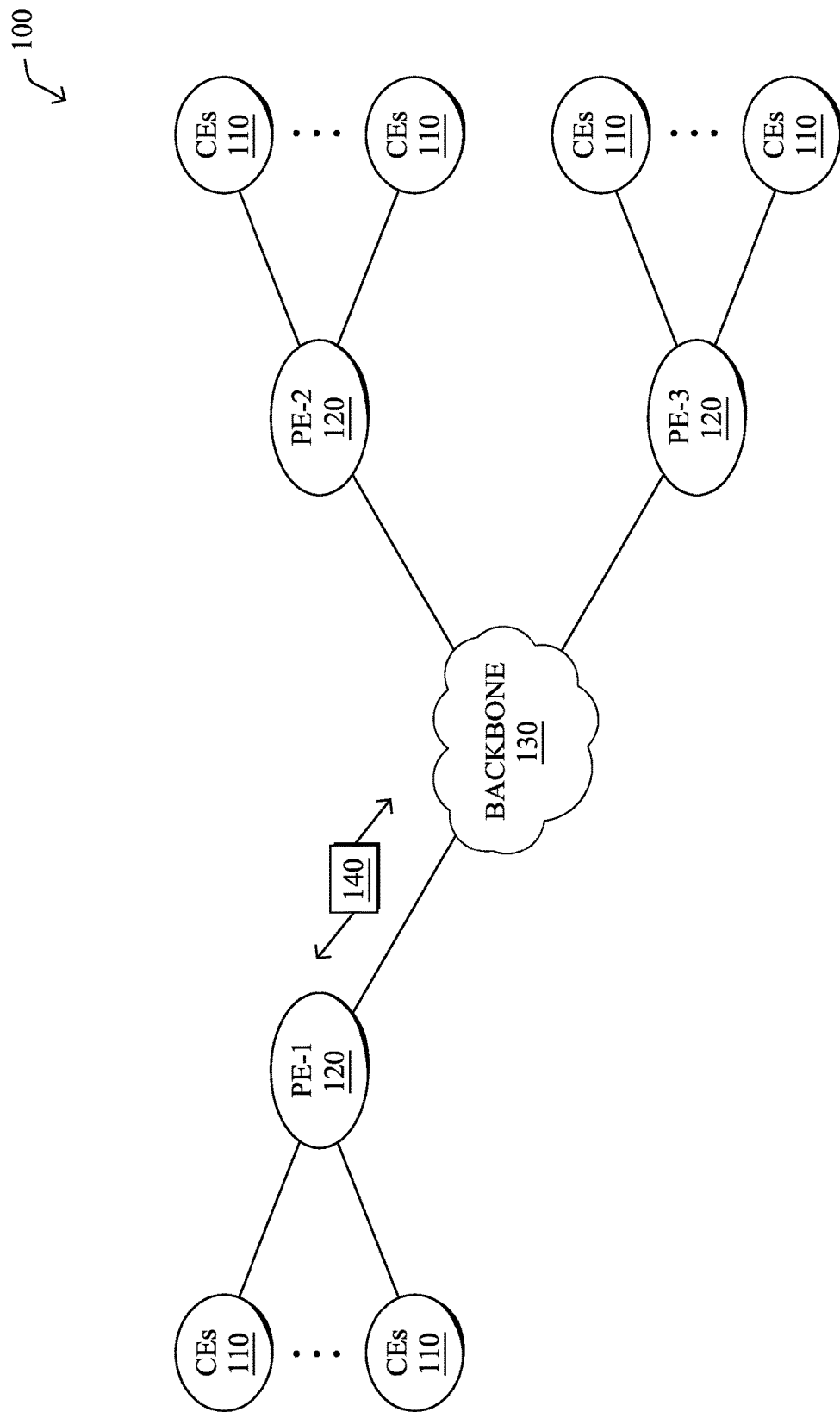
FIGS. 1A-1B illustrate an example communication network.

According to one or more embodiments of the disclosure, a device identifies a plurality of online applications whose traffic is conveyed via an interface of a networking entity of a network. The device computes a relationship between a quality of experience metric for a particular online application in the plurality of online applications and a traffic volume associated with the interface for the plurality of online applications. The device makes, based on the relationship, a determination that degradation of the quality of experience metric for the particular online application is due to the traffic volume associated with the interface for the plurality of online applications. The device reconfigures, based on the determination, the networking entity to prioritize traffic for the particular online application.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative backbone network 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
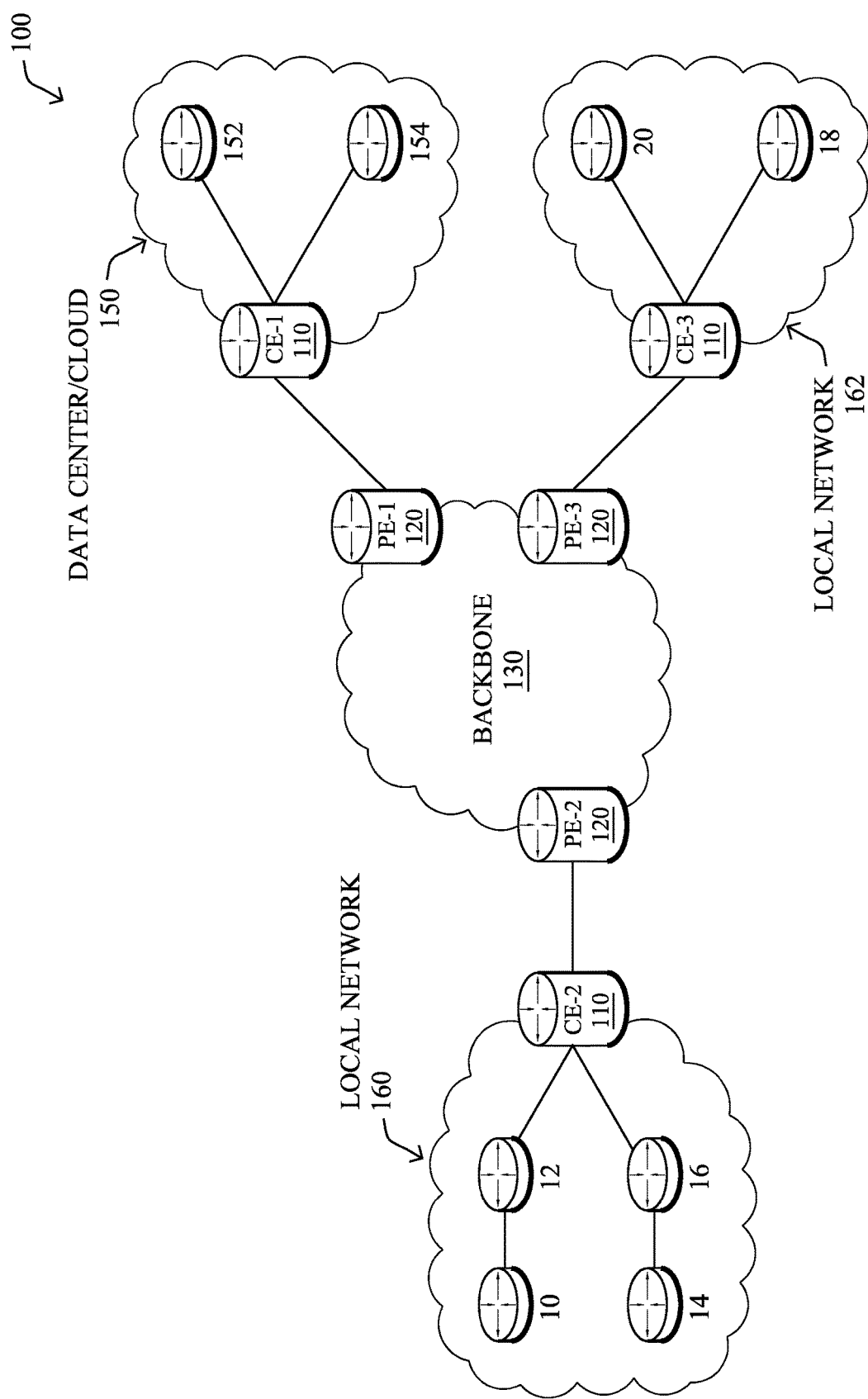

FIG. 1B illustrates an example of network 100 in greater detail, according to various embodiments. As shown, backbone network 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone network 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
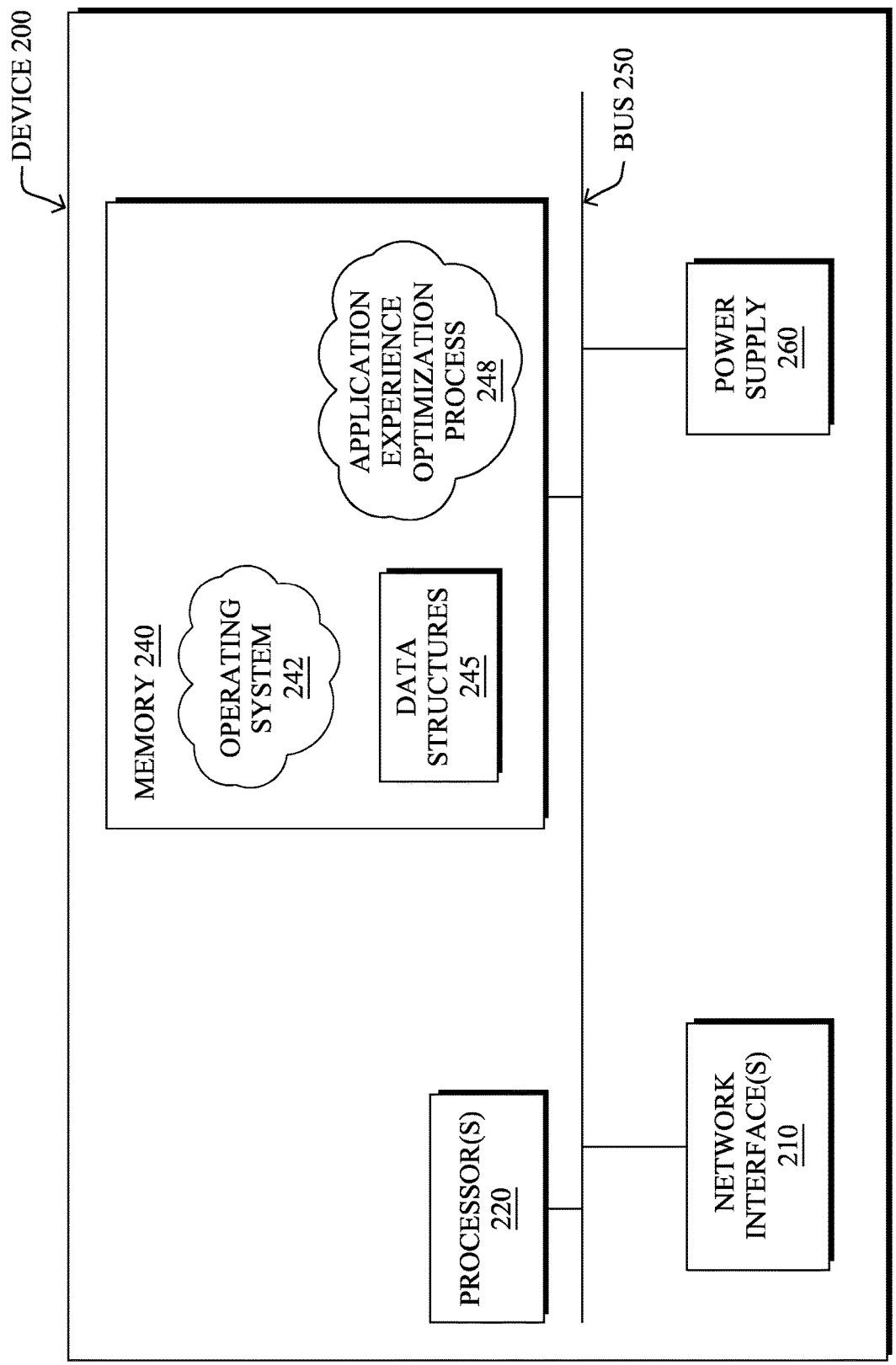
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize artificial learning/machine learning. In general, artificial intelligence/machine learning is concerned with the design and the development of techniques that take as input empirical data (such as network statistics and performance indicators), and recognize complex patterns in these data. One very common pattern among these techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 may employ one or more supervised, unsupervised, or semi-supervised machine learning models. Generally, supervised learning entails the use of a training set of data, as noted above, that is used to train the model to apply labels to the input data. For example, the training data may include sample data that has been labeled as indicative of acceptable user experience or poor user experience. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
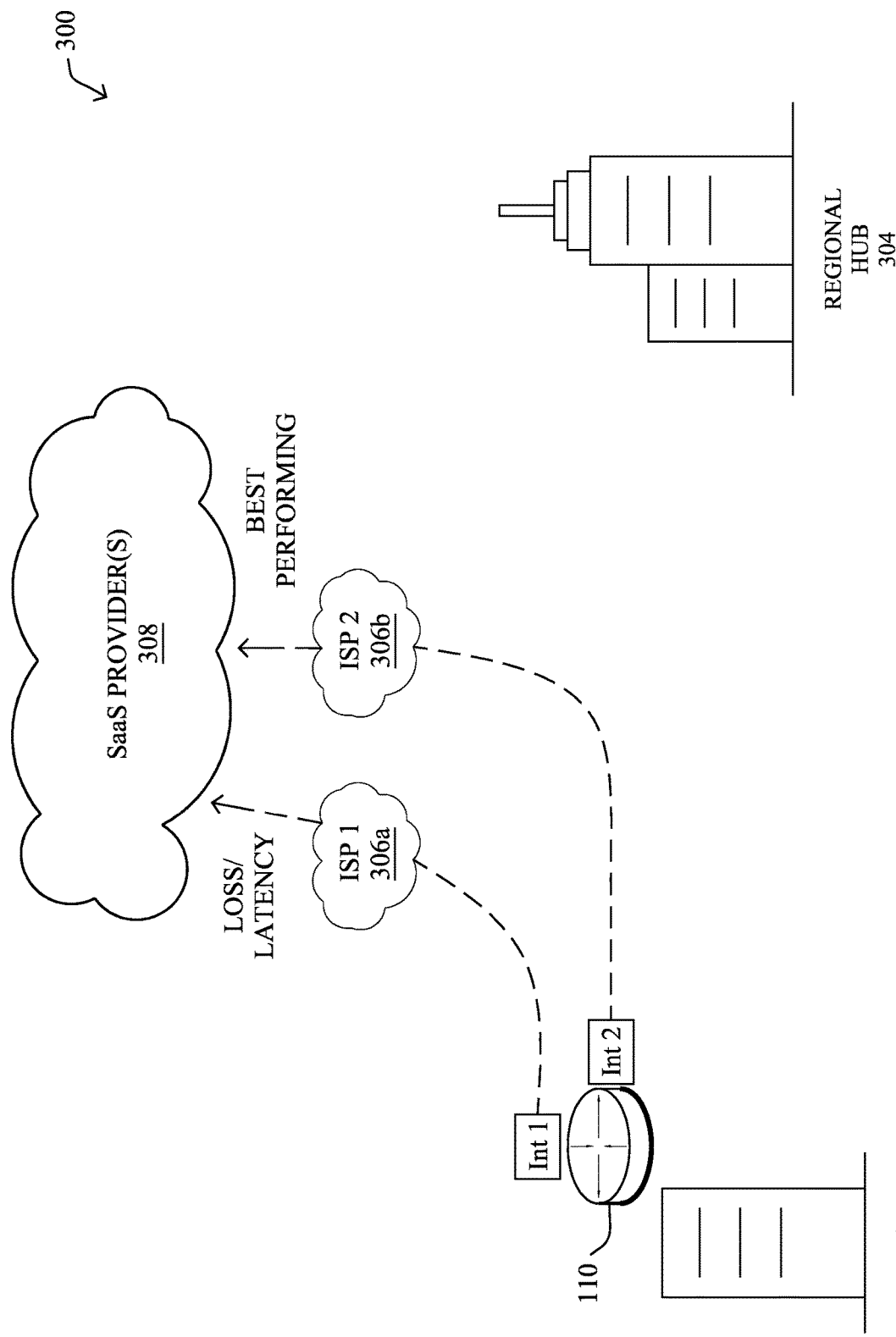
FIGS. 3A-3B illustrate example network deployments.
Figure 3B:
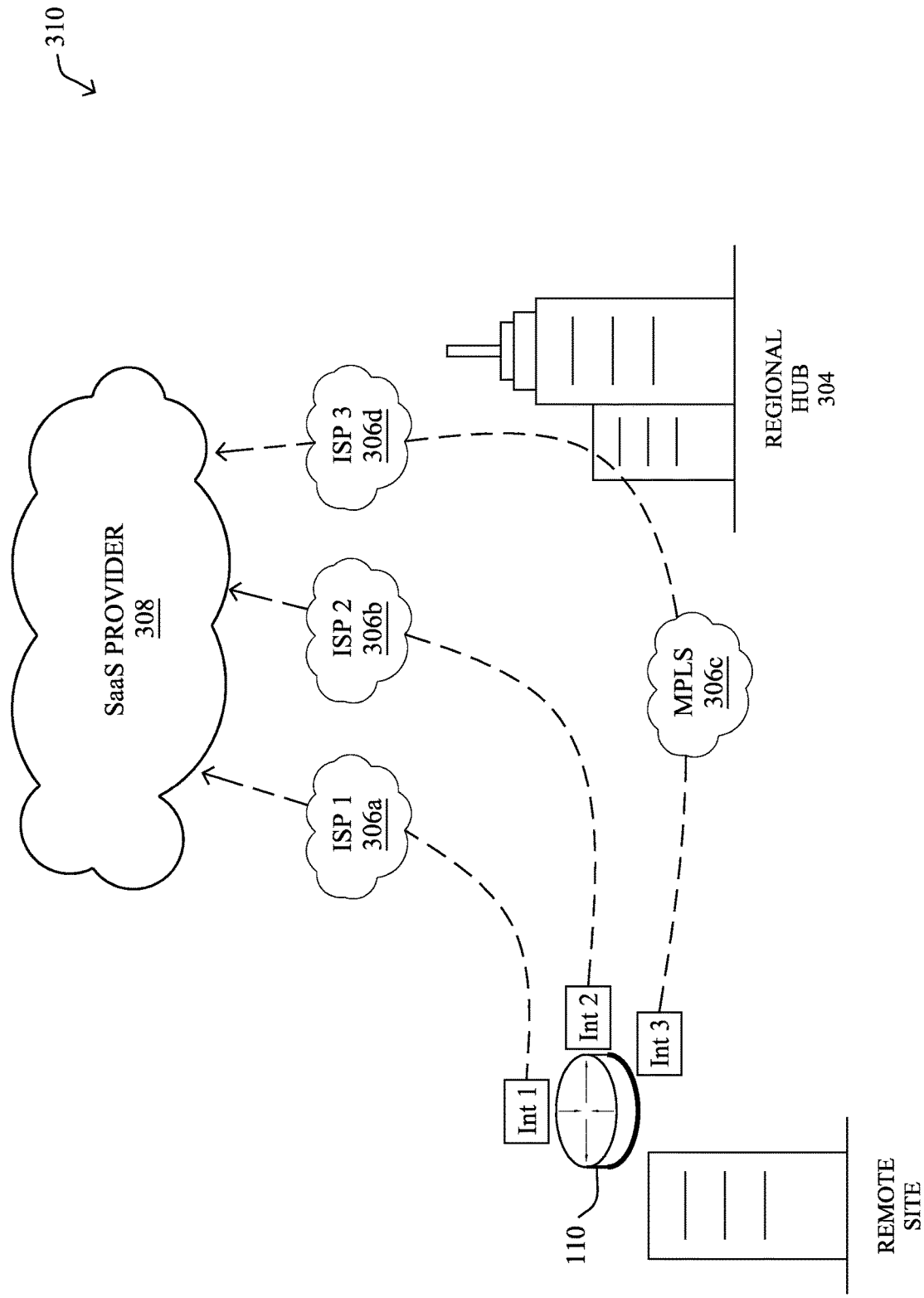

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MILS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
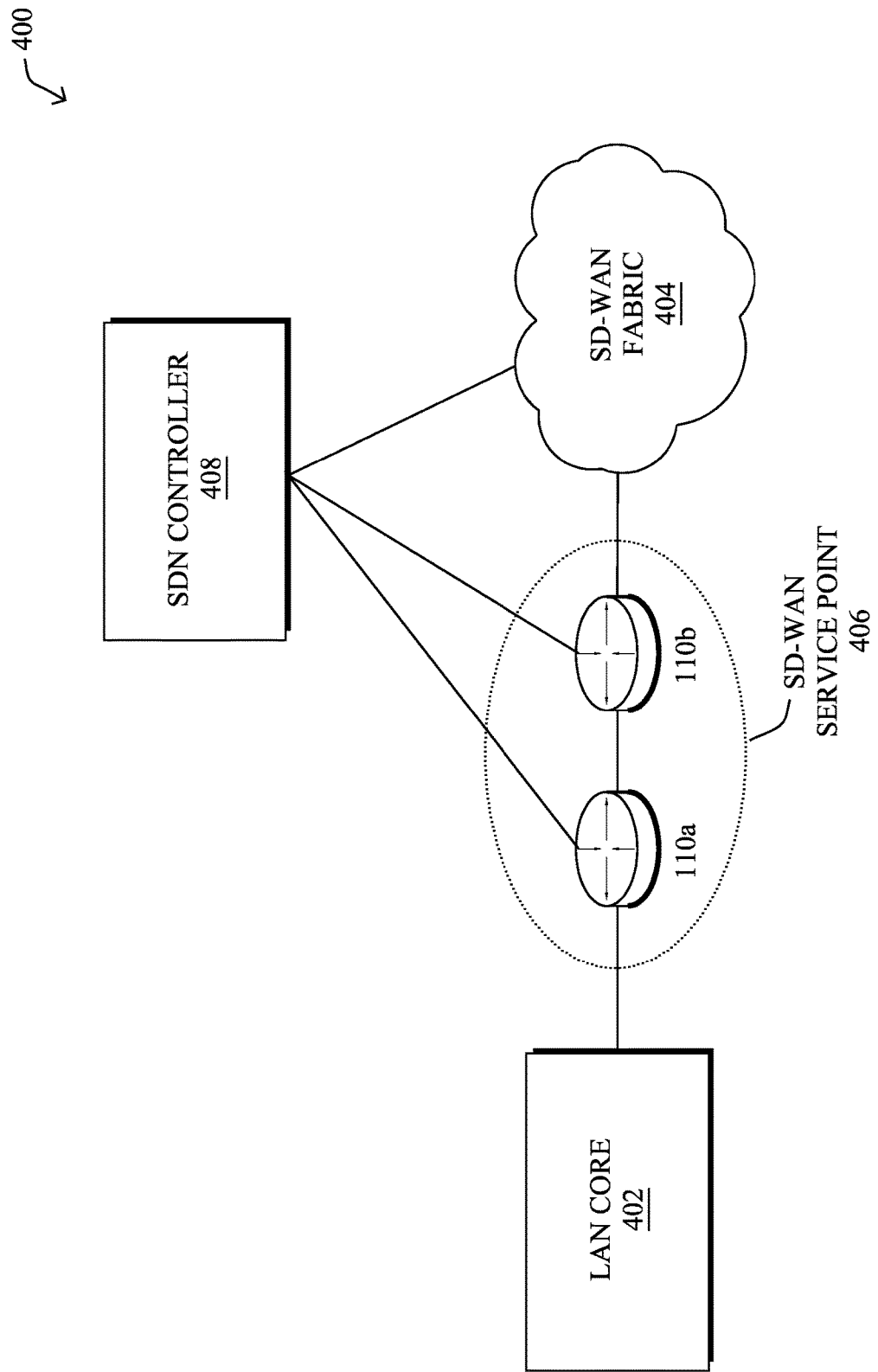
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B and the like.

A primary networking goal may be to design and optimize the network to satisfy the requirements of the applications that it supports. So far, though, the two worlds of "applications" and "networking" have been fairly siloed, More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application (i.e., the user experience).

More and more applications are moving to the cloud and many do so by leveraging an SaaS model. Consequently, the number of applications that became network-centric has grown approximately exponentially with the raise of SaaS applications, such as Office 365. ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.
Routing is still entirely reactive: decisions are made using probes that reflect the status of a path at a given time, in contrast pith the notion of an informed decision,
SLA failures are very common in the Internet and a good proportion of them could be avoided (e.g., using an alternate path), if predicted in advance.

Figure 4B:
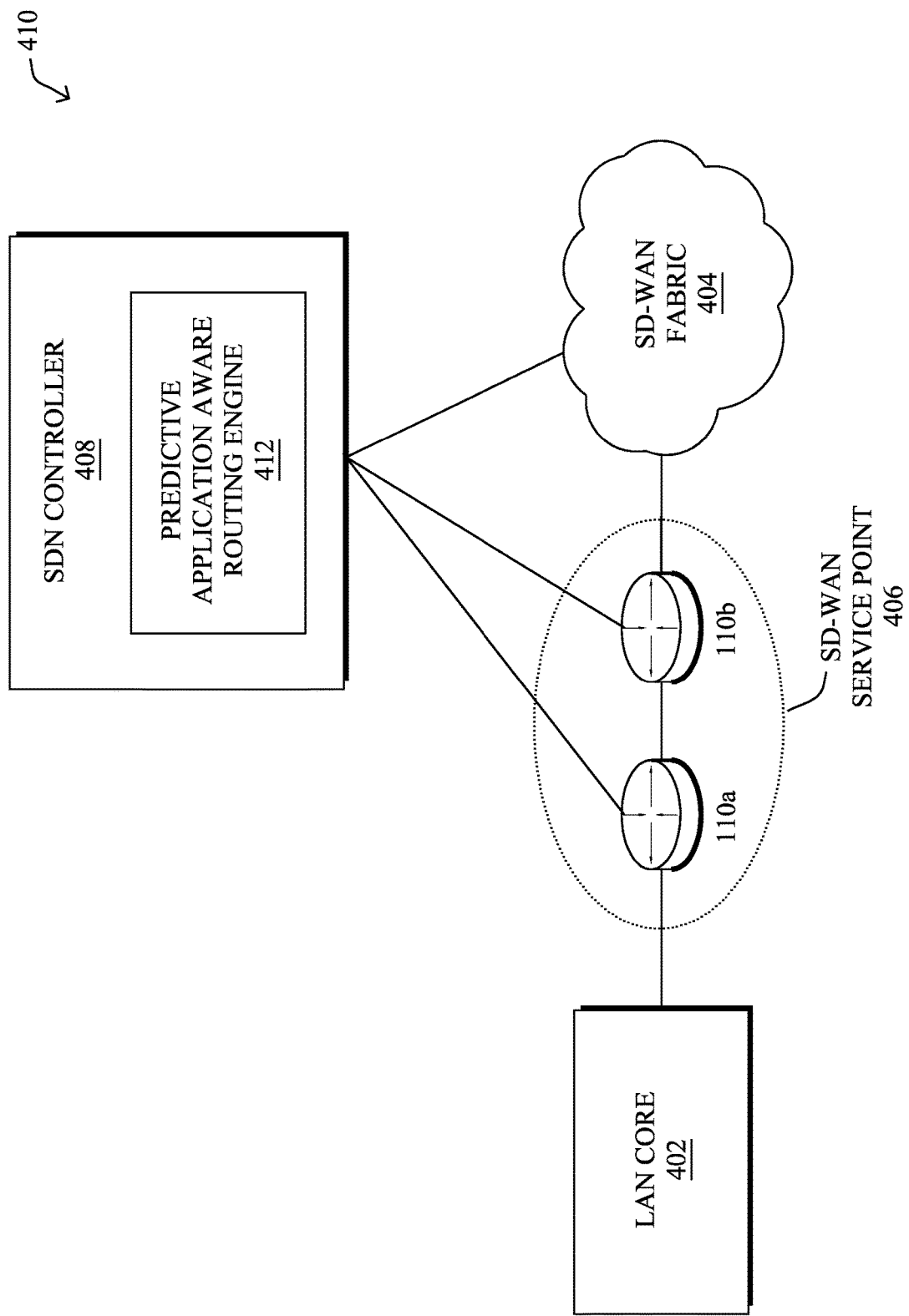

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also refereed to herein as routing "patches," which are typically temporary in nature (e.g., active for a specified period of time) and may also be application-specific (e.g., for traffic of one or more specified applications).

As would be appreciated, modern SaaS applications are typically delivered globally via public cloud infrastructure using cloud native services. Even though public cloud providers may have a high number of points of presence (PoPs) and use those to deliver the application, globally. Still, testing has shown that user quality of experience (QoE) may vary greatly based on the location of the user. This is because all public cloud providers are delivering services which are region-based and applications are running in specific region(s) and location(s). Indeed, even though it might seem that an online application is global (e.g., because of its use of globally-available CloudFront POPs, etc.), in reality it might run in a single region/location and user experience might vary greatly based on the location.

To determine the QoE for a particular SaaS application, various approaches are possible such as:
  Obtaining user feedback directly from the application
  Applying traffic analytics, such as by analyzing Netflow records that include extra metrics like Application Response Time (ART)
  Sending synthetic path probes to measure networking metrics to each SaaS application from each location. These probes are 'synthetic' in that they seek to mimic the actual characteristics of the traffic of the application under scrutiny.
  Using hand-crafted heuristics based on domain expertise and other quantities (e.g., the concealment time)

In various embodiments, predictive application aware routing engine 412 may make use of any or all of the above approaches. For instance, predictive application aware routing engine 412 may make use of an API for a particular online application, allowing it to obtain application experience/QoE metrics directly from the application. Such metrics may be combined with probing results and/or path telemetry. This is in sharp contrast to network-centric approaches that do not necessarily reflect the true user experience.

As noted above, predictive routing techniques, such as those used by predictive application aware routing engine 412, aim to select the best path out of a collection of paths $\{P_1, P_2, \ldots, P_N\}$ such that end users of given online application, such as an SaaS application (e.g., WebEx, Microsoft Teams, Zoom, Salesforce, SharePoint, etc.) or a custom application hosted in a private datacenter (and monitored via tools such as Datadog, AppDynamics, etc.) have the best experience possible.

While such routing techniques applied in a WAN can help to optimize the QoE of an online application, a new challenge has arisen with the increasing popularity of work-from-home positions and hybrid work environments that blend on-site workers with remote workers. Indeed, the networking resources available to the home of a user may be quite different than those available at an office building or other site of an enterprise network. In addition, the types of traffic associated with the home network of a person also typically differ considerably from that of an enterprise network.

Figure 5:
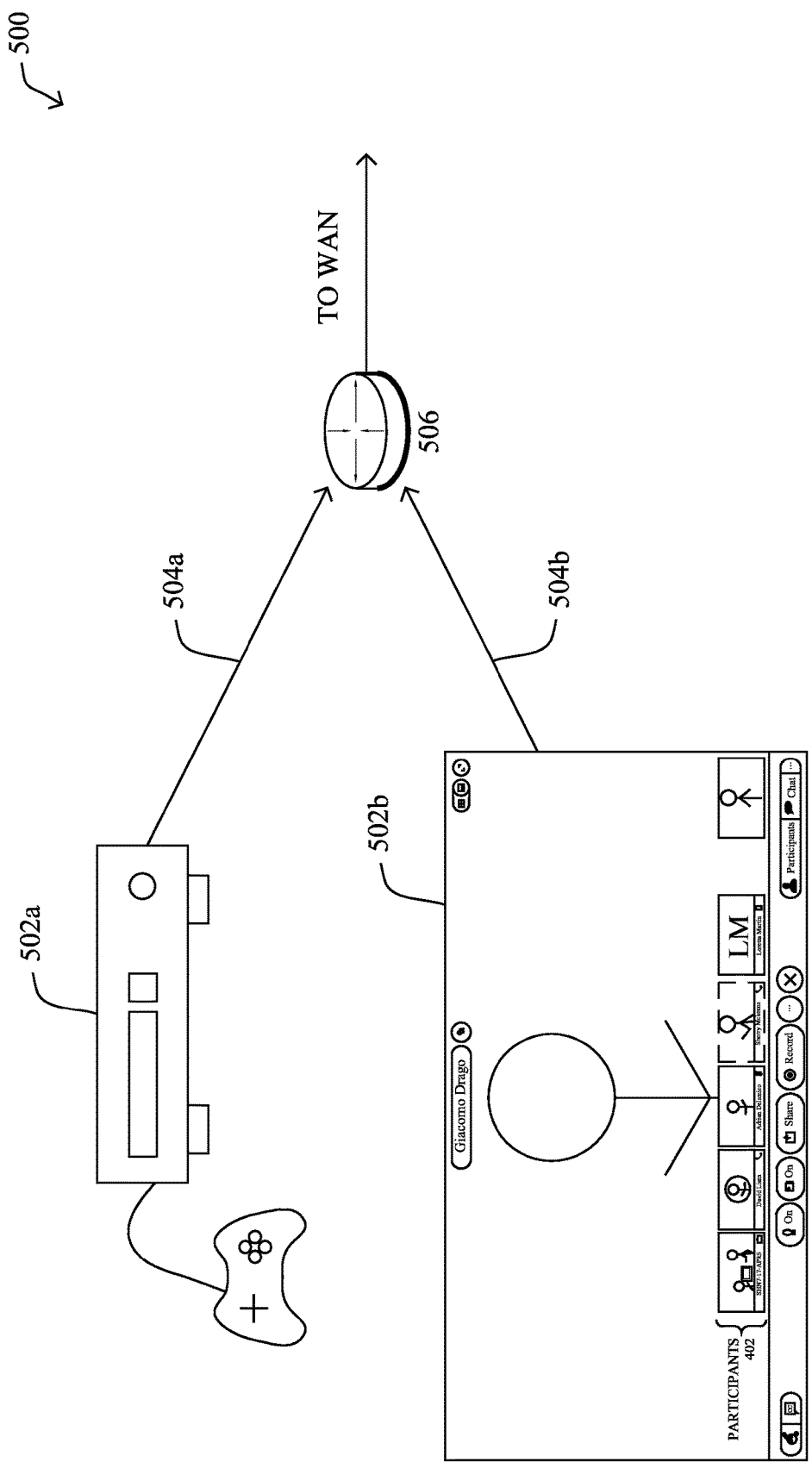
FIG. 5 illustrates an example home network.

By way of example, FIG. 5 illustrates a home network 500 that comprises various endpoint devices 502 and a networking entity 506 (e.g., a home router or gateway) that provides connective between home network 500 and a WAN. For instance, endpoint deice 502a may be a video game console, while endpoint 502b may be a laptop. Each of these devices may also send traffic 504 externally via networking entity 506. For instance, endpoint deice 502a may send traffic 504a that is associated with an online gaming application, while endpoint 502b may send traffic 504b that is associated with a videoconferencing application.

In some cases, the mixture of business critical application traffic (e.g., video conferencing traffic, productivity or collaboration traffic, etc.) and non-critical application traffic (e.g., gaming traffic, television streaming traffic, etc.) can itself lead to degraded application experience/QoE for an online application. This is true, even if there are routing mechanisms in place in the external network, to optimize their external paths. For instance, congestion at a particular interface of networking entity 506 could cause the videoconference displayed on endpoint 502b to freeze or break up for its user.

Optimizing Application Experience in Hybrid Work Environments

The techniques introduced herein provide for the optimization of application experience in hybrid work environments by identifying conditions in which the mixture of traffic for different types of online applications lead to a degradation in the QoE of any of them considered 'critical.' In some aspects, the techniques herein do so by determining the relationship between the QoE of a particular application and the traffic load of an interface of the networking entity via which the mixture of traffic is sent. If degradation is found, the techniques herein further introduce mitigation mechanisms to help alleviate or even eliminate this degradation.

Illustratively, the techniques described herein may be performed by hardware, software, and/or firmware, such as in accordance with application experience optimization process 248, which may include computer executable instructions executed by the processor 220 (or independent processor of interfaces 210) to perform functions relating to the techniques described herein.

Specifically, according to various embodiments, a device identifies a plurality of is online applications whose traffic is conveyed via an interface of a networking entity of a network. The device computes a relationship between a quality of experience metric for a particular online application in the plurality of online applications and a traffic volume associated with the interface for the plurality of online applications. The device makes, based on the relationship, a determination that degradation of the quality of experience metric for the particular online application is due to the traffic volume associated with the interface for the plurality of online applications. The device reconfigures, based on the determination, the networking entity to prioritize traffic for the particular online application.

Figure 6:
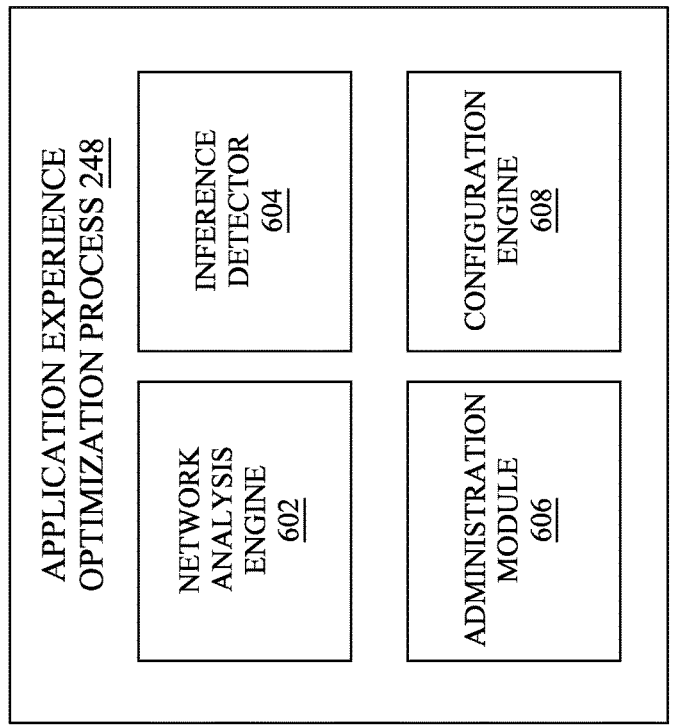
FIG. 6 illustrates an example architecture for optimizing application experience in hybrid work environments.

Operationally, FIG. 6 illustrates an example architecture for optimizing application experience in hybrid work environments, according to various embodiments. At the core of architecture 600 is application experience optimization process 248, which may be executed by a controller for a network or another device in communication therewith. For instance, application experience optimization process 248 may be executed by a controller for a network (e.g., SDN controller 408 in FIGS. 4A-4B, a path computation element, etc.), a particular networking entity in the network (e.g., a router, a gateway, etc.), another device or service in communication therewith, or the like. In further embodiments, architecture 600 may be implemented as part of a secure access service edge (SASE) deployment.

As shown, architecture 600 may include any or all of the following components: a network analysis engine 602, an interference detector 604, an administration module 606, and/or a configuration engine 608. As would be appreciated, the functionalities of these components may be combined or omitted, as desired. In addition, these components may be implemented on a singular device or in a distributed manner, in which case the combination of executing devices can be viewed as their own singular device for purposes of executing application experience optimization process 248.

In various embodiments, network analysis engine 602 may be responsible for obtaining the details of the local area network (LAN), such as LAN 500 in FIG. 5, in a home or other network that connects to a plurality of online applications. Generally speaking, the aim of network analysis engine 602 is twofold: 1.) to obtain the list of online applications accessed by the endpoints in the LAN and behavioral information for their respective traffic and 2.) to identify the set of networking entities that can provide WAN connectivity to the LAN (e.g., wired, wireless, cellular, etc.). In addition, network analysis engine 602 may also obtain performance telemetry from the LAN, such as wireless signal strength information, errors, signal to noise ratio (SNR) measurements, or the like.

To this end, network analysis engine 602 may discover the set of devices in the IAN that are capable of gathering and reporting telemetry regarding the LAN. For instance, network analysis engine 602 may send a customized broadcast message into the LAN requesting all devices to provide information related to potential WAN uplinks and traffic telemetry. In return, all such capable devices return telemetry to the requesting device executing network analysis engine 602.

In some embodiments, if network analysis engine 602 is hosted by a networking entity, such as a home router, network analysis engine 602 may also be configured to perform packet inspection on the packets of the application traffic that traverses that networking entity. For instance, network analysis engine 602 may perform deep packet inspection (DPI) on the packets, to identify the set of online applications associated with the traffic. Note that some traffic may be entirely local (e.g., not forwarded to the Internet) or external (e.g., sent from the LAN to the Internet via one of the available WAN connections). Here, the external traffic is the traffic of interest and most likely to cause QoE degradation for any applications deemed critical for a home-based worker.

Interference detector 604 may be used to detect potential interference between the traffic of the different online applications being accessed by the LAN, in various embodiments. In general, these applications may fall into two categories:

Those online applications that are considered to be 'critical' for a home-based worker. For instance, such applications may include, but are not limited to, videoconferencing applications (e.g., Webex, Zoom, etc.), productivity applications (e.g., Office 365, etc.), other collaboration applications (e.g., instant messaging applications, document management/storage applications, etc.).

Those online applications that are considered to be 'non-critical' for a home-based worker. Typically, these types of applications are those that may be accessed by a user other than that of the home-based user, such as a television streaming application (e.g., Netflix, Disney+, etc.), an online gaming application, or the like.

The overall intent of interference detector 604 is to identify cases in which the QoE of an application that is deemed critical to a home-based user is impinged as a result of the other, non-critical application traffic. To do so, in various embodiments, interference detector 604 may analyze any or all of the following information:

The list of online applications identified by network analysis engine 602 and their corresponding telemetry The status of the queue(s) for the outgoing interface on the networking entity that provides external connectivity (subject to congestion)

One or more QoE metrics for a particular application of interest. In one embodiment, interference detector 604 may obtain a QoE metric that is based on one or more path metrics, such as delay, loss, or jitter (e.g., using a set of static templates that are applied to the path metrics). These metrics could be measured in a variety of ways, including the sending of synthetic probes along the network paths, if available (e.g., based on ThousandEyes probes or the like). In further embodiments, interference detector 604 may obtain the QoE metrics from the online application(s) themselves. For instance, an online application may indicate the MOS score, a QoE metric based on user-provided feedback ratings, or the like, for use by interference detector 604.

In various embodiments, interference detector 604 may use any or all of the above information to determine the relationships between the QoE of an application of interest and information associated with the interface via which traffic for that application is conveyed. For instance, interference detector 604 may compute the correlation between the QoE metric for the application, the traffic volume for all applications whose traffic is conveyed via that interface, and/or the status of the queue(s) associated with the interface (e.g., their average queue lengths, the activation of packet drops using mechanisms such as Weighted Random Early Detection, the existence of input/output traffic shapers, etc.). Here, the particular online application may be flagged in advance as being critical/of importance or the list of such applications may be left empty until further analysis has been performed.

In some embodiments, interference detector 604 may compute the statistical correlation between every pair of metrics (e.g., the observed QoE of the application and several various other metrics). For example, Pearson's coefficient can be used if the input metrics in the two applications is linear and there are no large outliers. Otherwise, Spearman's rank correlation coefficient or Kendall's Tau correlation coefficient could be used.

In yet other embodiments, interference detector 604 may leverage a regression or other machine learning model that has been trained to predict the QoE metric of an application as a function of several other QoE of other applications. In such cases, the feature importance of important variables could be used as a proxy for how much the traffic metrics are capable of predicting QoE.

In addition, interference detector 604 may also detect potential seasonality using, for example, auto-correlation (serial correlation), such as by computing the linear relationship between the lagged values of time series. Indeed, there may only be a correlation or other relationship between the QoE of a particular application and the information regarding the networking entity at certain times of the day (e.g., its traffic volume on its egress interface).

In some instances, the networking entity that provides WAN connectivity for the different types of application traffic may utilize an initial configuration that does not distinguish between the different types of application traffic. However, over time, application experience optimization process 248 may reconfigure the networking entity on-the-fly, so as to optimize at least the QoE of any of the applications deemed 'critical' to the home-based worker.

In various embodiments, administration module 606 may be responsible for presenting information to a network administrator or other user (e.g., the owner of the home router, etc.) via a user interface. For instance, administration module 606 may present any or all of the following for display:

The list of online applications identified by network analysis engine 602.

Any of the telemetry obtained by network analysis engine 602 and/or interference detector 604.

The criticality of the applications, if so defined. In some embodiments, the user may be able to specify back to administration module 606 whether any of the applications are considered to be critical or not.

The degree and nature of any interference detected by interference detector 604, along with the application QoE impact (e.g., whether the QoE is degraded/below a defined threshold).

Potential seasonality, as detected by interference detector 604.

For example, administration module 606 may display the following message: "Gaming and O365 have strong correlation everyday between 5:00 PM and 8:00 PM, leading to a negative impact on the O365 Teams QoE of more than 20%."

As noted, another potential function of administration module 606 may be to garner the criticality of the applications. For instance, assume that interference detector 604 determines that two applications, application A and application B, interfere with one another, by determining the correlations of their QoE metrics and the information regarding their shared interface. In such a case, administration module 606 may display a message similar to "Application A and application B interfere, leading to QoE degradation for application A. Is application A critical while application B is not?" By asking such a question, this allows the user to prioritize those applications knowing the potential interference and effects on the QoE. Doing so provides the user additional information than would otherwise be available were they to specify the criticalities a priori.

In some embodiments, configuration engine 608 may be configured to propose and/or implement any mitigation actions when the QoE of a particular online application is degraded. For instance, in various embodiments, configuration engine 608 may reconfigure the networking entity according to any of the following:

Treat the traffic of one or more of the online applications as best effort traffic. Under such an approach, no guarantee is given as to the actual delivery of the traffic, meaning that the networking entity may provide a lower quality of service to that traffic or even drop the traffic, as needed.

Assign resources to provide some bandwidth to the non-critical traffic, provided that doing so does not degrade the QoE of any critical traffic.

Reroute traffic for a critical application via a different WAN gateway. Such an option may be available, such when the home-based worker also has a cellular hotspot or other alternate WAN connection.

For instance, configuration engine 608 may create a new policy on the networking entity that specifies that traffic for all of the non-critical applications are to be sent as best effort via a low priority queue. For other non-critical applications for which at least some bandwidth may be guaranteed, configuration engine 608 may proceed as follows:

1. Allocate a dedicated queue for those applications having a minimal bandwidth, which could even be zero.
2. Monitor the QoE for all applications.
3. If the QoE metrics for all critical applications are not degraded, increase the queue bandwidth for the non-critical applications.

In yet another embodiment, alternative QoS techniques may also be used, such as by configuration engine 608 configuring (input) shapers.

As would be appreciated, if seasonality is detected (e.g., through the use of autocorrelation), the policy changes made by configuration engine 608 may be time-based and only applicable at certain times.

Figure 7:
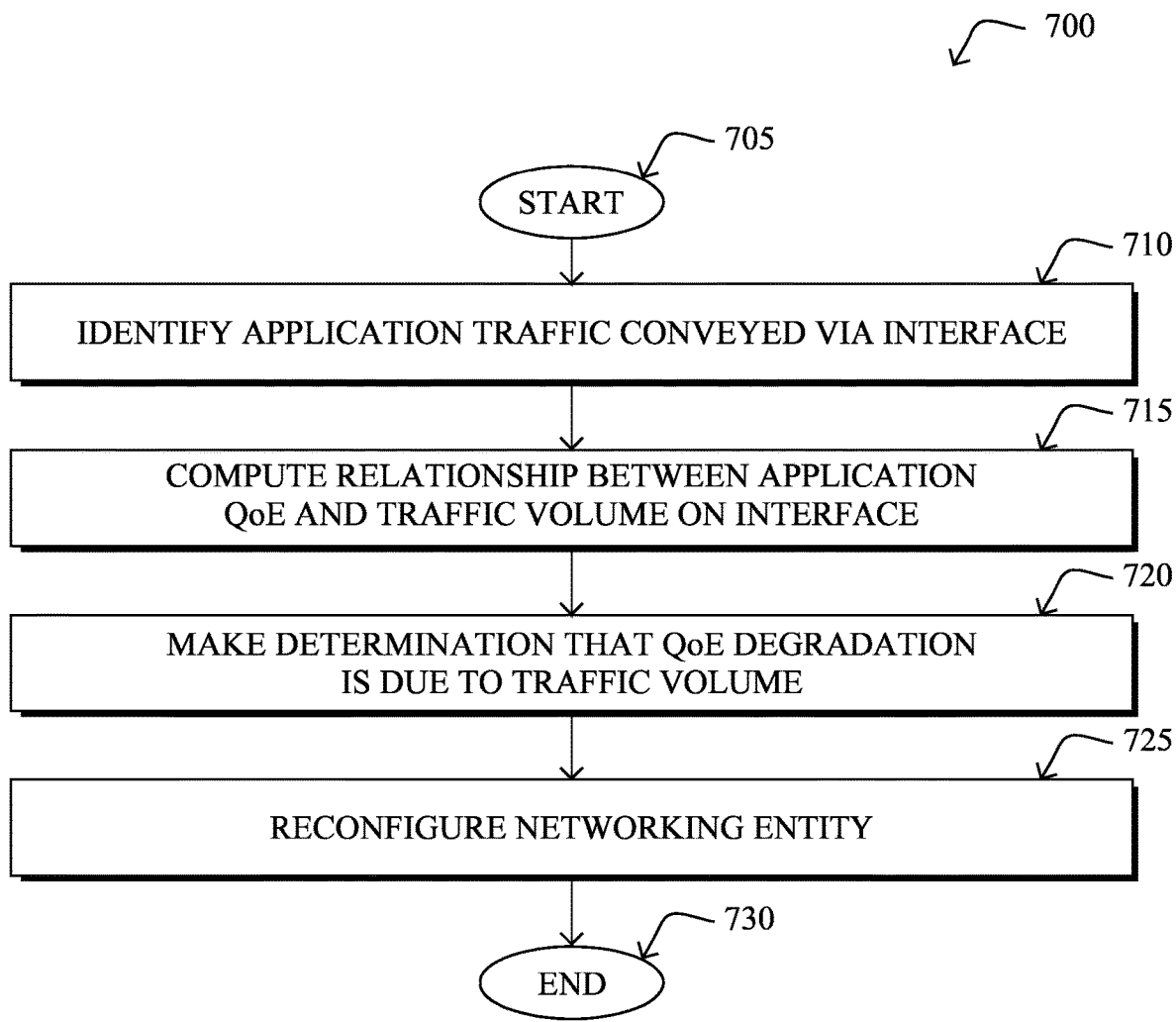
FIG. 7 illustrates an example simplified procedure for optimizing application experience in hybrid work environments.

FIG. 7 illustrates an example simplified procedure 700 (e.g., a method) for optimizing application experience in hybrid work environments, in accordance with one or more embodiments described herein. For example, a non-generic, specifically configured device (e.g., device 200), such as controller for a network (e.g., an SDN controller or other device in communication therewith, a networking entity, a path computation engine, etc.), may perform procedure 700 by executing stored instructions (e.g., application experience optimization process 248). The procedure 700 may start at step 705, and continues to step 710, where, as described in greater detail above, the device may identify a plurality of online applications whose traffic is conveyed via an interface of a networking entity of a network. In various embodiments, the networking entity may be a home router or gateway. In another embodiment, the device may itself be the networking entity. In some embodiments, the plurality of online applications are identified by performing packet inspection on their traffic.

At step 715, as detailed above, the device may compute a relationship between a quality of experience (QoE) metric for a particular online application in the plurality of online applications and a traffic volume associated with the interface for the plurality of online applications. In one embodiment, the QoE metric is provided by the particular online application (e.g., a MOS score calculated by the application, a rating based on user-provided feedback, etc.). In other embodiments, the QoE metric may be based on path probing results, such as based on measured delay, jitter, packet loss, etc. along a network path. In some embodiments, the relationship may comprise a correlation computed between the QoE metric and the traffic volume associated with the interface. In another embodiment, the relationship further relates the QoE metric, the traffic volume associated with the interface, and a status of a queue associated with the interface.

At step 720, the device may make a determination that degradation of the QoE metric for the particular online application is due to the traffic volume associated with the interface for the plurality of online applications, as described in greater detail above. For instance, if the device determines that the QoE metric At step 725, as detailed above, the device may, based on the determination, the networking entity to prioritize traffic for the particular online application. In one embodiment, the device may do so by configuring a lower priority queue associated with the interface for use by traffic that is not associated with the particular online application. In such a case, the device may also increase an allocated bandwidth for the lower priority queue, based on a determination that quality of experience metrics for each of the plurality of online applications are not degraded after allocation of the lower priority queue. In some embodiments, the device may also provide a listing of the plurality of online applications to a user interface. In turn, the device may also receive, receiving, via the user interface, an indication that the particular online application is more critical than one or more other online applications in the listing, whereby the networking entity is reconfigured based further in part on the indication. In yet another embodiment, the device may also cause traffic for the particular online application to be sent via an alternate gateway instead of the networking entity (e.g., a mobile hotspot instead of a home router, etc.). Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for optimizing application experience in hybrid work environments, it is to be understood that various other adaptations and modifications may be made within the spirit and scope of the embodiments herein.

For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   identifying, by a device, a plurality of online applications whose traffic is conveyed via an interface of a networking entity of a network;
   computing, by the device, a relationship between a quality of experience metric for a particular online application in the plurality of online applications and a traffic volume associated with the interface for the plurality of online applications, wherein the relationship comprises a correlation computed between the quality of experience metric and the traffic volume associated with the interface;
   making, by the device and based on the relationship, a determination that degradation of the quality of experience metric for the particular online application is due to the traffic volume associated with the interface for the plurality of online applications;
   providing, by the device and via a user interface, a listing of the plurality of online applications to the user interface in conjunction with the correlation;
   receiving, by the device via the user interface, an indication that the particular online application is more critical than one or more other online applications in the listing; and
   reconfiguring, by the device, the networking entity to prioritize traffic for the particular online application based on the determination and the indication.

2. The method as in claim 1, wherein the networking entity is a home router or gateway.

3. The method as in claim 1, wherein the plurality of online applications are identified by performing packet inspection on their traffic.

4. The method as in claim 1, wherein the quality of experience metric is provided by the particular online application.

5. The method as in claim 1, wherein reconfiguring the networking entity comprises:
   allocating, by the device, a lower priority queue associated with the interface for use by traffic that is not associated with the particular online application.

6. The method as in claim 5, further comprising:
   increasing, by the device, an allocated bandwidth for the lower priority queue, based on a determination that quality of experience metrics for each of the plurality of online applications are not degraded after allocation of the lower priority queue.

7. The method as in claim 1, wherein the relationship further relates the quality of experience metric, the traffic volume associated with the interface, and a status of a queue associated with the interface.

8. The method as in claim 1, further comprising:
causing, by the device, traffic for the particular online application to be sent via an alternate gateway instead of the networking entity.

9. An apparatus, comprising:
one or more network interfaces;
a processor coupled to the one or more network interfaces and configured to execute one or more processes; and
a memory configured to store a process that is executable by the processor, the process when executed configured to:
identify a plurality of online applications whose traffic is conveyed via an interface of a networking entity of a network;
compute a relationship between a quality of experience metric for a particular online application in the plurality of online applications and a traffic volume associated with the interface for the plurality of online applications, further wherein the relationship comprises a correlation computed between the quality of experience metric and the traffic volume associated with the interface;
make, based on the relationship, a determination that degradation of the quality of experience metric for the particular online application is due to the traffic volume associated with the interface for the plurality of online applications;
provide, via a user interface, a listing of the plurality of online applications to the user interface in conjunction with the correlation;
receive, via the user interface, an indication that the particular online application is more critical than one or more other online applications in the listing; and
reconfigure the networking entity to prioritize traffic for the particular online application based on the determination and the indication.

10. The apparatus as in claim 9, wherein the networking entity is a home router or gateway.

11. The apparatus as in claim 9, wherein the plurality of online applications are identified by performing packet inspection on their traffic.

12. The apparatus as in claim 9, wherein the quality of experience metric is provided by the particular online application.

13. The apparatus as in claim 9, wherein the apparatus reconfigured the networking entity by:
allocating a lower priority queue associated with the interface for use by traffic that is not associated with the particular online application.

14. The apparatus as in claim 13, wherein the process when executed is further configured to:
increase an allocated bandwidth for the lower priority queue, based on a determination that quality of experience metrics for each of the plurality of online applications are not degraded after allocation of the lower priority queue.

15. The apparatus as in claim 9, wherein the relationship further relates the quality of experience metric, the traffic volume associated with the interface, and a status of a queue associated with the interface.

16. A tangible, non-transitory, computer-readable medium storing program instructions that cause a device to execute a process comprising:
identifying, by the device, a plurality of online applications whose traffic is conveyed via an interface of a networking entity of a network;
computing, by the device, a relationship between a quality of experience metric for a particular online application in the plurality of online applications and a traffic volume associated with the interface for the plurality of online applications wherein the relationship comprises a correlation computed between the quality of experience metric and the traffic volume associated with the interface;
making, by the device and based on the relationship, a determination that degradation of the quality of experience metric for the particular online application is due to the traffic volume associated with the interface for the plurality of online applications;
providing, by the device and via a user interface, a listing of the plurality of online applications to the user interface in conjunction with the correlation;
receiving, by the device via the user interface, an indication that the particular online application is more critical than one or more other online applications in the listing; and
reconfiguring, by the device, the networking entity to prioritize traffic for the particular online application based on the determination and the indication.

\* \* \* \* \*